United States Patent
Alvarez et al.

(10) Patent No.: US 10,754,676 B2
(45) Date of Patent: Aug. 25, 2020

(54) SHARING OWNERSHIP OF AN INPUT/OUTPUT DEVICE USING A DEVICE DRIVER PARTITION

(71) Applicant: International Business Machines Corporation, Armonk, NY (US)

(72) Inventors: Juan J. Alvarez, Rochester, MN (US); Jesse P. Arroyo, Rochester, MN (US); Paul G. Crumley, Yorktown Heights, NY (US); Charles S. Graham, Rochester, MN (US); Joefon Jann, Ossining, NY (US); Timothy J. Schimke, Stewartville, MN (US); Ching-Farn E. Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/001,874

(22) Filed: Jan. 20, 2016

(65) Prior Publication Data

US 2017/0206105 A1 Jul. 20, 2017

(51) Int. Cl.
*G06F 9/455* (2018.01)
*G06F 11/07* (2006.01)
*G06F 9/38* (2018.01)

(52) U.S. Cl.
CPC ...... *G06F 9/45558* (2013.01); *G06F 11/0712* (2013.01); *G06F 9/3861* (2013.01); *G06F 2009/45579* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 8,219,989 B2 | 7/2012 | Armstrong et al. | |
| 8,418,166 B2 | 4/2013 | Armstrong et al. | |
| 8,495,632 B2 | 7/2013 | Armstrong et al. | |
| 8,645,155 B2 | 2/2014 | Brownlow et al. | |
| 8,677,356 B2 | 3/2014 | Jacobs et al. | |
| 8,825,981 B2 | 9/2014 | Brownlow et al. | |
| 8,839,240 B2 | 9/2014 | Barrett et al. | |
| 9,535,798 B1* | 1/2017 | Liguori | G06F 11/1451 |
| 2011/0107148 A1* | 5/2011 | Franklin | G06F 11/0712 |
| | | | 714/37 |
| 2012/0297379 A1 | 11/2012 | Anderson et al. | |
| 2013/0185739 A1* | 7/2013 | Farrell | G06F 9/542 |
| | | | 719/318 |

(Continued)

*Primary Examiner* — Duy Khuong T Nguyen
*Assistant Examiner* — Melissa A Headly
(74) *Attorney, Agent, or Firm* — Patterson + Sheridan, LLP

(57) ABSTRACT

The present disclosure relates to sharing an I/O device across multiple virtual machines. According to one embodiment, a computing system configures shared ownership of the I/O device between a first partition and one or more of the plurality of virtual machines. The computing system transfers partial ownership of the I/O device from the first partition to the one or more virtual machines and generates device configuration information for the I/O device. The virtual machines can use the generated device configuration information to access and configure the I/O device. Once the I/O device is configured for shared ownership, the computing system boots the one or more virtual machines.

16 Claims, 5 Drawing Sheets

(56) References Cited

U.S. PATENT DOCUMENTS

2014/0245297 A1* 8/2014 Hackett ............... G06F 9/5077
718/1
2018/0004559 A1* 1/2018 Geml .................. G06F 9/45558

* cited by examiner

SHARING OWNERSHIP OF AN INPUT/OUTPUT DEVICE USING A DEVICE DRIVER PARTITION

BACKGROUND

The present invention relates to sharing a physical device in a computing system, and more specifically to sharing a physical device across multiple virtual machines (e.g., logical partitions [LPAR]).

In paravirtualized environments, multiple virtual machines (e.g., LPARs) may use the same physical I/O device, such as a network adapter. The hypervisor may isolate virtual machines, allowing a single virtual machine to access the physical I/O device at a time. To allow each virtual machine to use the same physical I/O device, the hypervisor may present a virtual device to each virtual machine. When a virtual machine performs I/O operations on the virtual device, the hypervisor can intercept (and queue) I/O requests by the virtual machine and pass the requested commands to the physical I/O device. Generally, the hypervisor may have full ownership of the physical I/O device, and the virtual machines may not be able to directly access the physical I/O device or perform error recovery operations on the physical I/O device.

In some virtualized environments, a physical I/O device may allow multiple virtual machines to use the device concurrently through single root I/O virtualization (SR-IOV). In SR-IOV, a physical device may have physical functions (PFs) that allow for input/output and device configuration, as well as one or more virtual functions (VFs) that allow for data input/output. For example, an n-port network adapter may expose m VFs (e.g., one or more VF for each port) that may be used by the virtual machines hosted on a computing system. A hypervisor on the host computing system may interact with the physical I/O device using the PFs, while each can directly communicate with a portion of the physical I/O device using one or more VFs.

If VMs communicate and use physical I/O devices through a hypervisor, performance may be negatively impacted due to additional processing required at the hypervisor to move data and commands from the physical I/O device to the appropriate VM. In a virtualized environment where VMs use VFs exposed by an I/O device that supports SR-IOV, VMs may not be able to use all of the features supported by the I/O device.

SUMMARY

One embodiment disclosed herein includes a method for sharing an I/O device across a plurality of virtual machines. The method generally includes configuring shared ownership of the I/O device between a first partition and one or more of the plurality of virtual machines. A computing system transfers partial ownership of the I/O device from the first partition to the one or more virtual machines and generates device configuration information for the I/O device. The virtual machines can use the generated device configuration information to access and configure the I/O device. Once the I/O device is configured for shared ownership, the computing system boots the one or more virtual machines.

Another embodiment includes a computer-readable storage medium having instructions, which, when executed on a processor, performs an operation for sharing an I/O device across a plurality of virtual machines. The operations generally include configuring shared ownership of the I/O device between a first partition and one or more of the plurality of virtual machines. A computing system transfers partial ownership of the I/O device from the first partition to the one or more virtual machines and generates device configuration information for the I/O device. The virtual machines can use the generated device configuration information to access and configure the I/O device. Once the I/O device is configured for shared ownership, the computing system boots the one or more virtual machines.

Still another embodiment includes a processor and a memory storing a program, which, when executed on the processor, performs an operation for sharing an I/O device across a plurality of virtual machines. The operations generally include configuring shared ownership of the I/O device between a first partition and one or more of the plurality of virtual machines. A computing system transfers partial ownership of the I/O device from the first partition to the one or more virtual machines and generates device configuration information for the I/O device. The virtual machines can use the generated device configuration information to access and configure the I/O device. Once the I/O device is configured for shared ownership, the computing system boots the one or more virtual machines.

DETAILED DESCRIPTION

Embodiments presented herein describe techniques for sharing ownership of a physical I/O device across multiple virtual machines. By sharing ownership of a physical I/O device across multiple virtual machines, a virtual machine can directly interface with the physical I/O device and fully use the capabilities of the physical I/O device. The virtual machines can bypass communicating with the physical I/O device through a hypervisor, which may improve I/O device performance for the virtual machines. Additionally, by sharing ownership of a physical I/O device across multiple virtual machines, the virtual machines may use the same functionality of the same physical I/O device concurrently.

Figure 1:
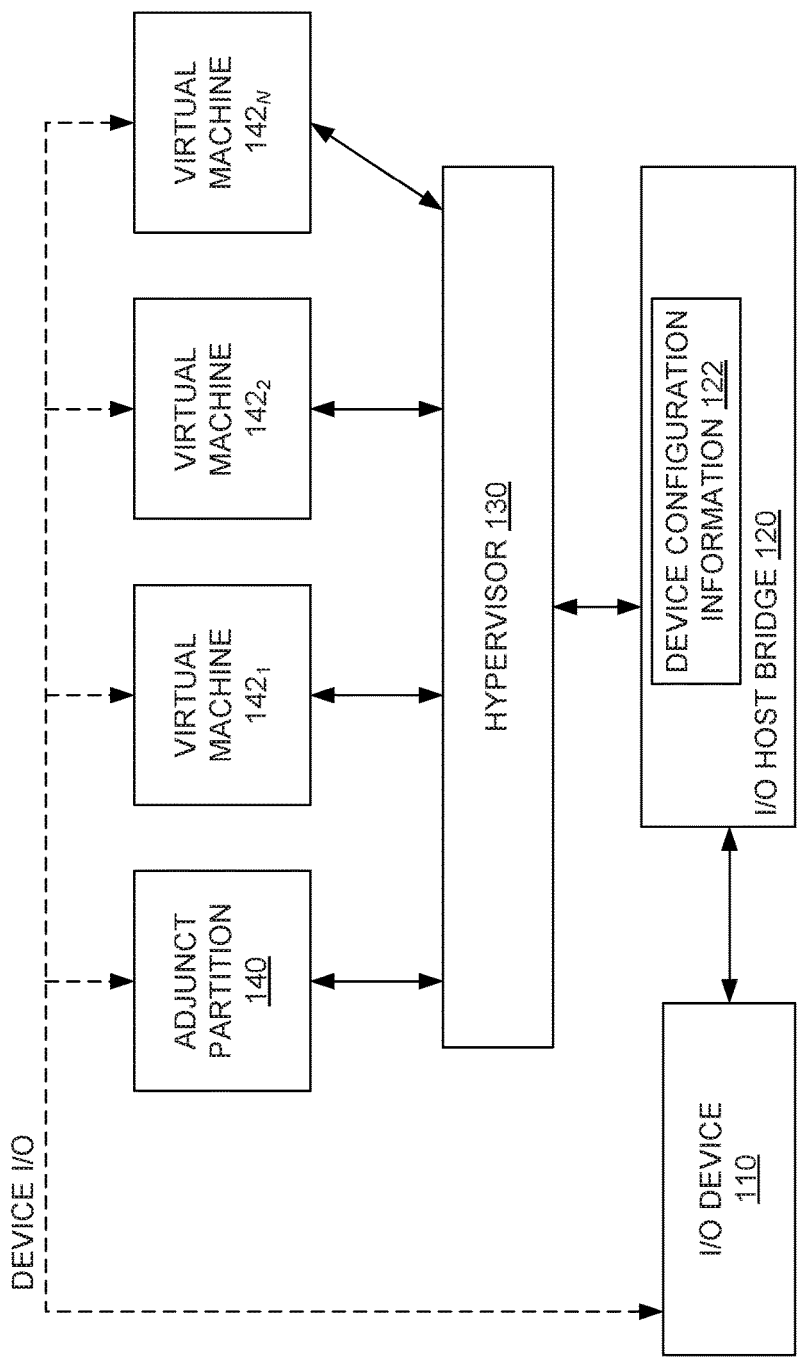
FIG. 1 illustrates an example system architecture in which one or more virtual machines share ownership of and interface directly with an I/O device, according to one embodiment.

FIG. 1 illustrates an example architecture of a system in which one or more virtual machines share ownership of an I/O device, according to one embodiment. As illustrated, computing system 100 includes an I/O device 110, an I/O host bridge 120, hypervisor 130, adjunct partition 140, and one or more virtual machines 142.

I/O device 110 can provide a variety of services and/or functionality to an operating system operating as a host on computing system 100 or one or more virtual machines 142. For example, I/O device 110 may provide network connectivity functions to computing system 100, coprocessor functionality (e.g., graphics processing, encryption/decryption, database processing, etc.). I/O device 110 may interface with other components in computing system 100 via, for example, a PCI Express bus. In some cases, I/O device 110 may denote a single adapter function, but need not be the entire physical I/O adapter.

I/O device 110 may expose one or more physical functions to a host operating system (or hypervisor 130) and one or more virtual machines 142 having shared ownership of I/O device 110. For example, an I/O device 110 may have multiple I/O functions that can be shared among a number of virtual machines 142 (e.g., via adjunct partition 140, as described in further detail below). An adjunct partition 140 may have access to each of the one or more physical functions supported by I/O device 110 and may share one or more of the physical functions with each virtual machine 142. The adjunct partition 140 may, but need not, share the entire set of physical functions with each virtual machine 142.

I/O host bridge 120 generally provides an interface between one or more central processing units (CPUs) and I/O device 110 and allows a host operating system (or hypervisor) to configure I/O device 110. As illustrated, I/O host bridge 120 maintains configuration information 122 for I/O device 110. Configuration information 122 includes, for example, configuration addresses, memory mapped I/O (MMIO) memory space information, direct memory access space information, and I/O device interrupt information for I/O device 110. When computing system 100 operates (e.g., at boot time or when a new I/O device 110 has been added to computing system 100), computing system 100 may create an assignable I/O unit (e.g., partitionable endpoint) that identifies I/O device 110, the functionality exposed by I/O device 110 (e.g., a physical function), and the memory and interrupt addresses to be used by computing system 100 (and/or virtual machines 142 hosted on computing system 100).

Hypervisor 130 generally provides operating system functionality (e.g., process creation and control, file system process threads, etc.) as well as CPU scheduling and memory management for one or more virtual machines 142 managed by hypervisor 130. While computing system 100 operates, hypervisor 130 generally interfaces with adjunct partition 140 and I/O host bridge 120 to establish shared ownership of an I/O device 110 between multiple virtual machines 142. Each of the virtual machines may contain the device driver for the I/O device 110.

Adjunct partition 140 generally acts as the primary owner of an I/O device 110 and a central point of management for the I/O device (e.g., for error recovery operations). At boot (or initialization) time, adjunct partition 140 has full ownership of and access to I/O device 110. To set up I/O device 110 for shared ownership by one or more virtual machines 142 operating on computing system 100, hypervisor 130 sets an internal flag to indicate that I/O device 110 is owned by adjunct partition 140. In some cases, adjunct partition 140 may be a lightweight, hidden partition that hosts device drivers and provides other services to one or more virtual machines 142 hosted on computing system 100, but need not host a general purpose operating system or external-facing functionality.

Hypervisor 130 proceeds to set device configuration information 122 at host bridge 120 with information about I/O device 110. By setting device configuration information 122, hypervisor 130 defines a partitionable endpoint, which may include, as discussed above, configuration addresses, memory mapped I/O memory spaces, direct memory access spaces, and interrupt information. The interrupt information may include, for example, an interrupt number (or range) as well as information about the owner of the I/O device (e.g., adjunct partition 140).

After hypervisor 130 configures I/O device 110 at I/O host bridge 120, hypervisor 130 may receive a command from adjunct partition 140 to transfer partial ownership of I/O device 110 to a first virtual machine 142 (e.g., virtual machine $142_1$). Virtual machine $142_1$ may include a device driver for I/O device 110, which allows virtual machine $142_1$ to use the functionality of I/O device 110. Upon receiving the command to transfer partial ownership of the I/O device 110 to a first virtual machine 142 (e.g., virtual machine $142_1$), hypervisor 130 sets the internal flag to indicate that ownership of I/O device 110 is shared between adjunct partition 140 and the first virtual machine $142_1$. Hypervisor 130 additionally configures I/O host bridge to reassign resources to the first virtual machine $142_1$. For example, hypervisor 130 can reassign a number of interrupts (e.g., message signaled interrupts and/or level signaled interrupts) to virtual machine $142_1$. Hypervisor 130 may additionally reassign certain MMIO address spaces, direct memory access spaces, and configuration spaces, and so on to virtual machine $142_1$.

In preparation for booting up virtual machine $142_1$, hypervisor 130 additionally generates information that virtual machine 142 may use to discover and access I/O device 110. For example, hypervisor 130 may establish or populate an existing device tree or table including information about I/O device 110. When virtual machine $142_1$ is booted, virtual machine $142_1$ uses the device tree or table to discover and access I/O device 110. In some embodiments, the data in a device tree or table established and populated by hypervisor 130 may be substantially similar to a device tree or table used in a non-virtualized environment, which allows virtual machine $142_1$ to host a substantially unmodified operating system kernel. Subsequently, hypervisor 130 may boot virtual machine $142_1$, which reads the device tree or table, discovers I/O device 110, and configures I/O device 110 on boot.

In some cases, adjunct partition 140 (which, as discussed above, initially has full ownership of I/O device 110) may access and configure I/O device 110 using an I/O device configuration cycle. To configure I/O device 110, adjunct partition 140 indicates to hypervisor 130 that adjunct partition 140 is attempting to access the configuration space of I/O device 110. Hypervisor 130 examines the identity of the adjunct partition and ownership information associated with I/O device 110. If adjunct partition 140 is identified in the ownership information as an owner authorized to access the configuration space, hypervisor 130 sequences configuration requests from the adjunct partition 140 with configuration requests received from virtual machines $142_1$-$142_N$. When hypervisor 130 executes the configuration request from the adjunct partition 140, hypervisor 130 transmits the configuration request to I/O host bridge 120 for processing. Upon completion, hypervisor 130 returns a result to adjunct partition 140 indicating whether or not the requested configuration was successful.

During operations on computing system 100, I/O device 110 may trigger an error that may be handled by computing system 100 without requiring that computing system 100 (and any virtual machines 142 operating on computing system 100) be rebooted. Hypervisor 130 may receive a signal from I/O host bridge 120 indicating that I/O device 110 has encountered an error and capture information about the error from the signal. For example, I/O device 110 may return invalid values in one or more locations in the memory space associated with I/O device 110. Subsequently, hypervisor 130 checks the internal flags described above to determine if any virtual machines 142 share ownership of I/O device 110 with adjunct partition 140. If the internal flags indicate that one or more virtual machines 142 share ownership of I/O device 110, hypervisor 130 can block the one or more virtual machines 142 from beginning I/O device recovery until adjunct partition 140 completes I/O device recovery. Finally, hypervisor 130 triggers I/O device recovery at adjunct partition 140.

When I/O device 110 encounters an error, adjunct partition 140 queries hypervisor 130 for information about the error to start recovery operations on I/O device 110. Because adjunct partition 140 is the primary owner of I/O device 110, hypervisor 130 receives the query, determines that the query is from the primary owner of I/O device 110, and transmits error recovery information to adjunct partition 140. When adjunct partition 140 receives the error recovery information, adjunct partition 140 begins performing error recovery operations, which may include re-configuring I/O device 110 (e.g., through configuration requests transmitted to I/O device 110). Upon completing error recovery, adjunct partition 140 informs hypervisor 130 that error recovery at adjunct partition 140 is completed and that error recovery at the one or more virtual machines 142 that are shared owners of I/O device 110 may begin.

Upon detecting an I/O device error, virtual machine 142 may query hypervisor 130 to obtain information about the error and start recovery operations for I/O device 110. While adjunct partition 140 (the primary owner of I/O device 110) performs recovery operations on I/O device 110, virtual machine 142 receives a signal from hypervisor 130 indicating that recovery operations are ongoing at adjunct partition 140 and that virtual machine 142 is blocked from beginning recovery operations. Virtual machine 142 may query hypervisor 130 for information about the recovery state of I/O device 110 (e.g., that adjunct partition 140 is currently performing recovery operations) until hypervisor 130 indicates that recovery operations have completed at adjunct partition 140.

In some cases, error recovery operations at adjunct partition 140 may not be able to reset I/O adapter 110 for continued use by adjunct partition 140 and the one or more virtual machines 142. In such a case, I/O adapter 110 may be replaced. To allow for replacement of I/O adapter 110, adjunct partition 140 indicates to hypervisor 130 that I/O device 110 is to be replaced. In response, hypervisor 130 revokes ownership of I/O device 110 from each of the one or more virtual machines 142 that are shared owners of I/O device 110. To revoke ownership of I/O device 110 from the one or more virtual machines 142 that share ownership of I/O device 110 with adjunct partition 140, hypervisor 130 sets the internal flags tracking ownership of I/O device 110 to reflect that adjunct partition 140 is the sole owner of I/O device 110.

Subsequently, hypervisor 130 configures I/O host bridge 120 to reassign I/O device resources to adjunct partition 140. The resources reassigned to adjunct partition 140 may include, for example, I/O device interrupt ranges, memory mapped I/O address spaces, direct memory access address spaces, I/O device configuration space, and so on. Upon reassigning I/O device resources to adjunct partition 140, hypervisor 130 and/or adjunct partition 140 may allow a user to hot-swap I/O device 110 for a replacement I/O device. Once the replacement I/O device is hot-swapped into computing system 100, adjunct partition 140 configures the I/O device and transfers ownership of the replacement I/O device to one or more virtual machines 142, as discussed above.

Figure 2:
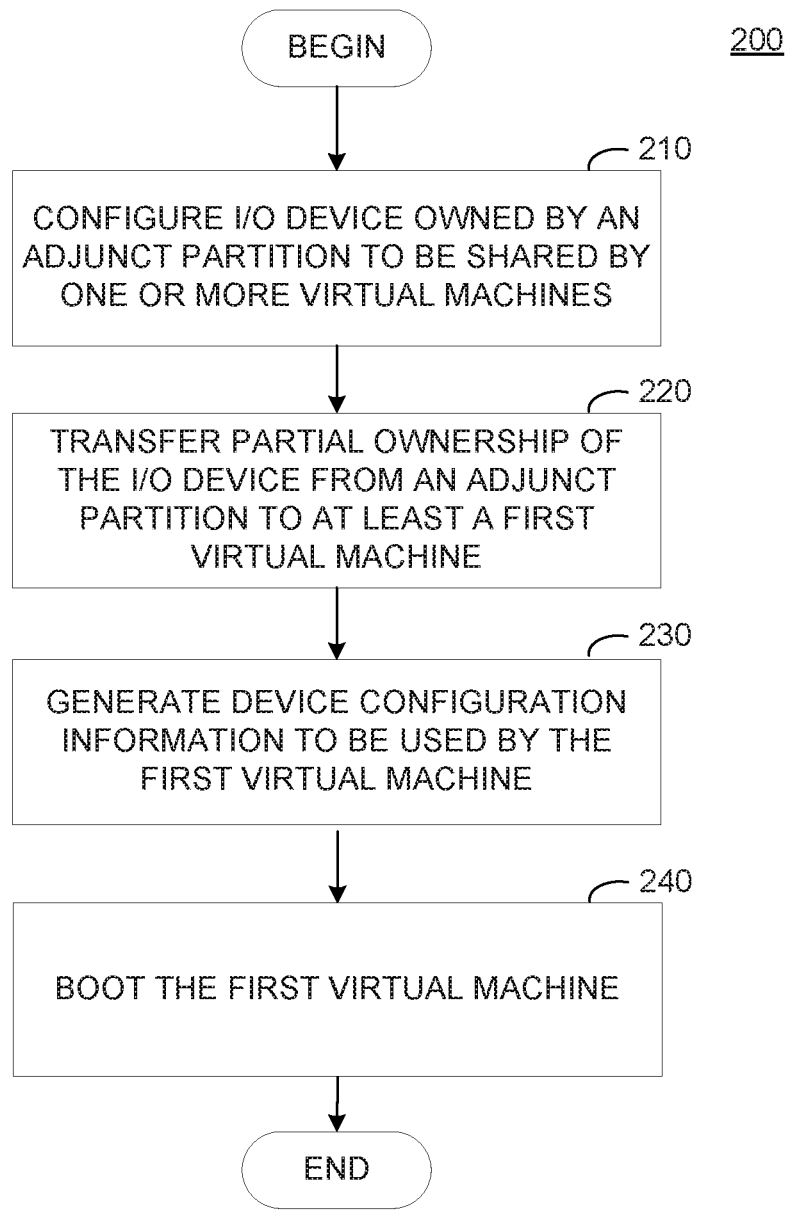
FIG. 2 illustrates example operations that may be performed by a computing system to establish shared I/O device ownership between a device owner and one or more virtual machines, according to one embodiment.

FIG. 2 illustrates example operations 200 that may be performed by a hypervisor to configure and transfer ownership of a shared I/O device to one or more virtual machines, according to an embodiment. Operations 200 begin at step 210, where the hypervisor configures an I/O device to be shared by one or more virtual machines. As discussed above, a hypervisor can configure an I/O device, which is initially (e.g., on system boot) owned solely by an adjunct partition, with a set of resources. The resources may include, for example, a defined function for the I/O device, interrupt ranges, configuration addresses, memory mapped I/O and/or direct memory access memory spaces, and so on.

Once the hypervisor completes configuring the I/O device, at step 220, the hypervisor transfers partial ownership of the I/O device from an adjunct partition to at least a first virtual machine. As discussed above, the hypervisor may transfer partial ownership of the I/O device to one or more virtual machines upon receiving a request from the adjunct partition to transfer partial ownership of the I/O device to a specified virtual machine (or set of virtual machines). Upon receiving the request to transfer ownership of the I/O device, the hypervisor can set an internal flag to indicate that the I/O device is owned by the adjunct partition (as the primary owner) and one or more virtual machines (as shared owners). Additionally, as discussed above, the hypervisor configures the I/O host bridge to reassign I/O resources (e.g., the I/O resources configured at step 210) to the specified virtual machine (or set of virtual machines)

At step 230, the hypervisor generates device configuration information to be used by the first virtual machine to discover and access the I/O device. For example, the hypervisor may generate and/or populate a set of Open Firmware Device Tree entries, which includes the physical access information to be used by the first virtual machine (and other virtual machines that share ownership of the I/O device) to locate, configure, and use the I/O device. At step 240, the hypervisor boots the first virtual machine. At boot time, the first virtual machine uses the device configuration information to find and configure the I/O device. Once the first virtual machine finds and configures the I/O device and completes other boot operations, workloads on the first virtual machine can use all of the capabilities of the I/O device concurrently with other virtual machines that are also configured to use the same I/O device.

Figure 3:
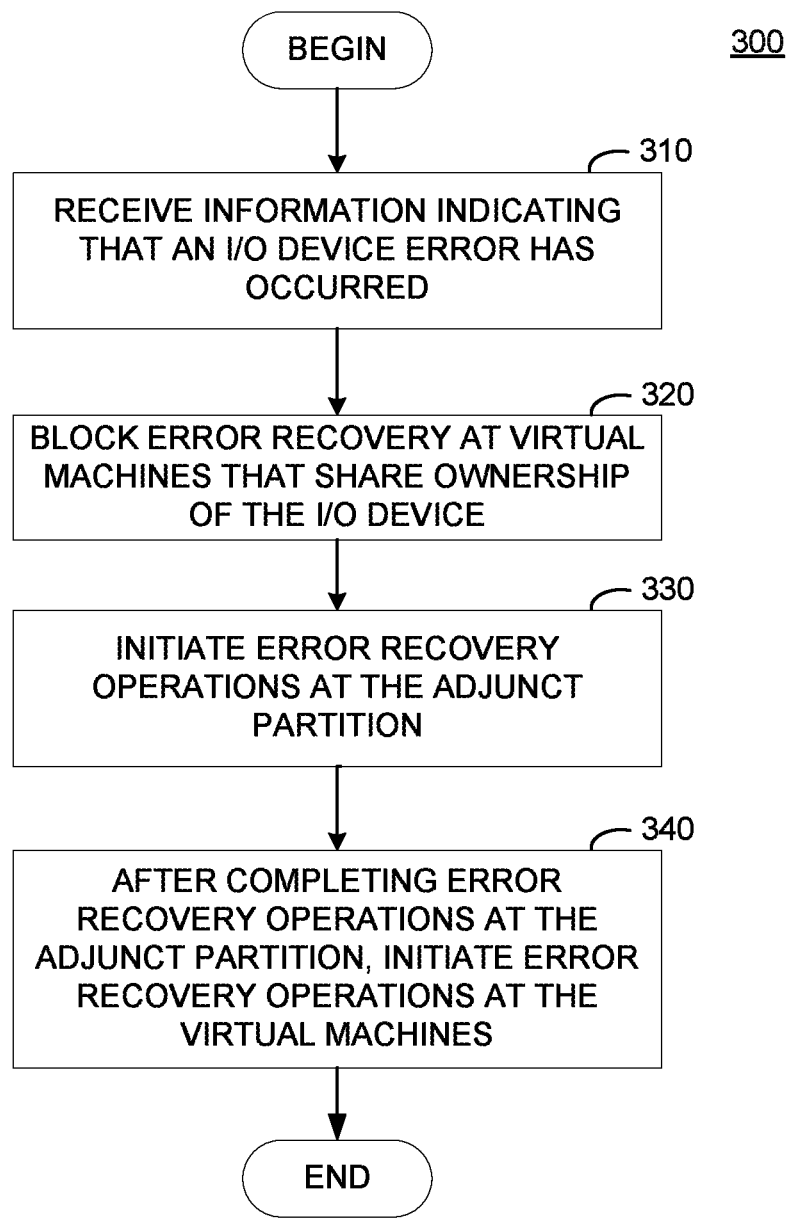
FIG. 3 illustrates example operations that may be performed by a computing system to perform error recovery on a shared I/O device, according to one embodiment.

FIG. 3 illustrates example operations 300 that may be performed by a hypervisor to perform error recovery on a shared I/O device, according to one embodiment. As illustrated, operations 300 begin at step 310, where the hypervisor receives information indicating that an I/O device error has occurred. As discussed above, the hypervisor can receive information about I/O device errors from, for example, the I/O host bridge, which can report an error when the I/O device has written bad data to particular memory addresses (or some other data indicating an error condition at the I/O device). Upon detecting the error, the I/O host bridge places the I/O device in a "frozen" state, which prevents further activity (e.g., memory mapped I/O, direct memory access, interrupt activity, etc.) until at least the adjunct partition performs error recovery operations on the I/O device.

At step 320, the hypervisor blocks error recovery at the one or more virtual machines that share ownership of the I/O device. As discussed above, the hypervisor can block error recovery at the one or more virtual machines by setting an internal flag associated with the I/O device to indicate that the adjunct partition is (or will be) performing recovery operations on the I/O device. When a virtual machine that shares ownership of the I/O device detects that the I/O device has encountered an error and queries the hypervisor for permission to begin error recovery operations, the virtual machine receives information from the hypervisor that blocks the virtual machine from initiating error recovery information. For example, the virtual machine may receive data indicating that the adjunct partition is currently performing error recovery operations on the I/O device and a timeout period after which the virtual machine is to query the hypervisor for permission to initiate error recovery operations on the I/O device or wait another timeout period to query the hypervisor.

At step 330, the hypervisor initiates error recovery operations at the adjunct partition. As discussed above, the hypervisor can send a message to the adjunct partition indicating that an error was detected for a particular I/O device. The hypervisor may subsequently receive a request for information about the error from the adjunct partition and respond with the error information. Upon receiving the error information from the hypervisor, the adjunct partition may begin error recovery operations at the adjunct partition. As described above, the error recovery operations may include, for example, transmitting reconfiguration requests from the adjunct partition to the I/O device.

At step 340, the hypervisor initiates error recovery operations at the one or more virtual machines that share ownership of the I/O device after the adjunct partition completes error recovery operations. As discussed above, when the adjunct partition completes error recovery operations, the adjunct partition can indicate to the hypervisor that the error recovery operations are complete. In response, the hypervisor can clear any flags indicating that error recovery operations are being performed at the adjunct partition. The virtual machines that are shared owners of the I/O device, upon querying the hypervisor for information about the error, receive information about the error rather than a signal indicating that the adjunct partition is currently performing error recovery operations on the I/O device and (in some cases) an amount of time to wait before querying the hypervisor for information about the error.

Figure 4:
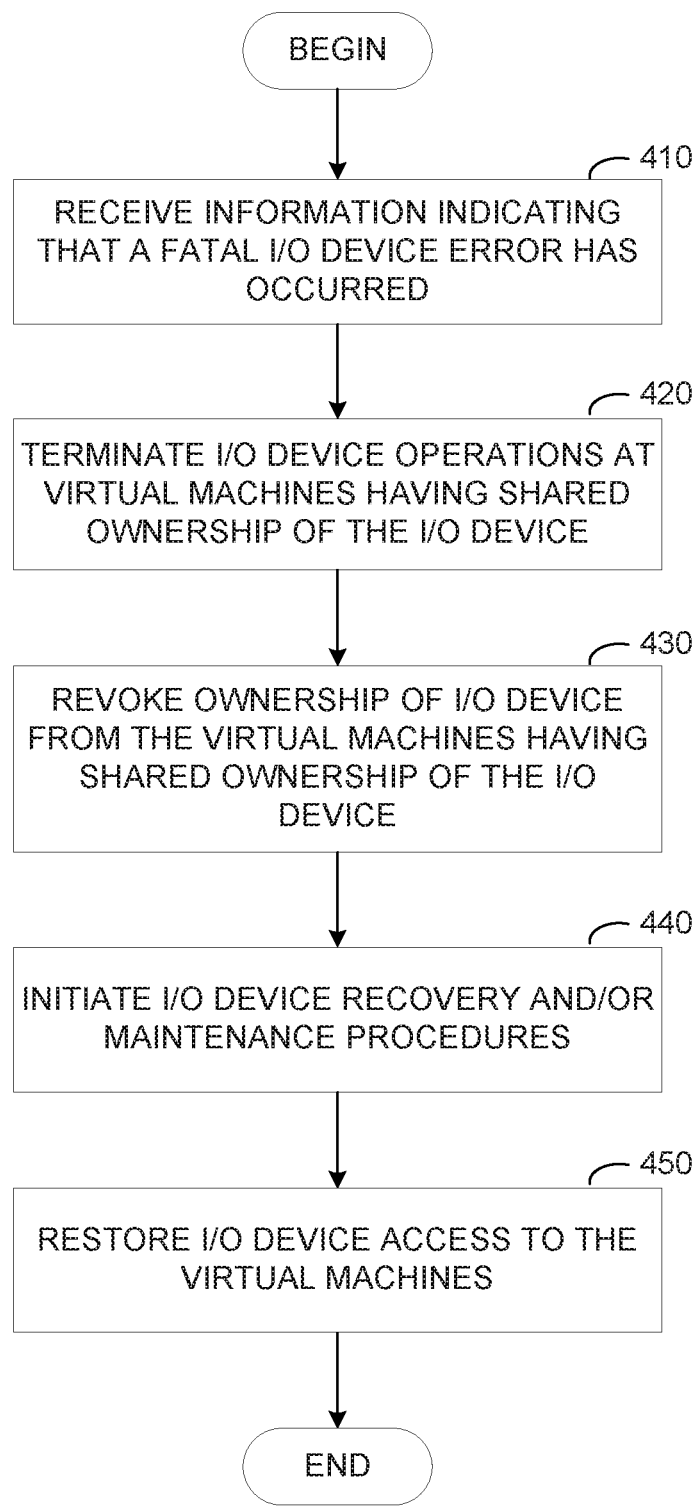
FIG. 4 illustrates example operations that may be performed by a computing system to revoke shared ownership of an I/O device from one or more virtual machines, according to one embodiment.

FIG. 4 illustrates example operations 400 that may be performed by a hypervisor to revoke shared ownership of an I/O device for recovery or maintenance of the I/O device, according to one embodiment. As illustrated, operations 400 may begin at step 410, where the hypervisor receives information indicating that a fatal I/O device error has occurred (e.g., a device error that may not be corrected using the error recovery procedures described above). The hypervisor may receive the information indicating that a fatal I/O device error has occurred, for example, from the adjunct partition that is the primary owner of the I/O device. The adjunct partition may indicate than an I/O device error is a fatal error, for example, if the error recovery procedures discussed above fail to reset the I/O device.

At step 420, the hypervisor terminates I/O device operations at the virtual machines having shared ownership of the I/O device. At step 430, the hypervisor proceeds to revoke ownership of the I/O device from the one or more virtual machines having shared ownership of the I/O device. To revoke ownership of the I/O device from a virtual machine having shared ownership of the I/O device, the hypervisor can configure the I/O host bridge and internal to reassign I/O resources to the adjunct partition. As discussed above, the I/O resources may include, for example, interrupt numbers and/or ranges, memory mapped I/O and/or direct memory access spaces, configuration spaces, and so on. Additionally, the hypervisor may set an internal flag used to track ownership of the I/O device to a value indicating that the adjunct partition is the sole owner of the I/O device.

After the hypervisor terminates I/O device operations at the virtual machines that were, prior to the fatal device error, shared owners of the I/O device and revokes ownership of the I/O device from those virtual machines, at step 440, the hypervisor initiates device recovery and/or maintenance procedures. These device recovery and/or maintenance procedures may include, for example, allowing the I/O device to be hot-swapped for another I/O device. When the device recovery and/or maintenance procedures are completed, the hypervisor proceeds to step 450, where the hypervisor restores I/O device access to the virtual machines. Restoring I/O device access to the virtual machines may be generally performed as described above with respect to FIG. 2, where the hypervisor assigns I/O device resources to the virtual machines, generates I/O device configuration information for the virtual machines, and boots the virtual machines.

Figure 5:
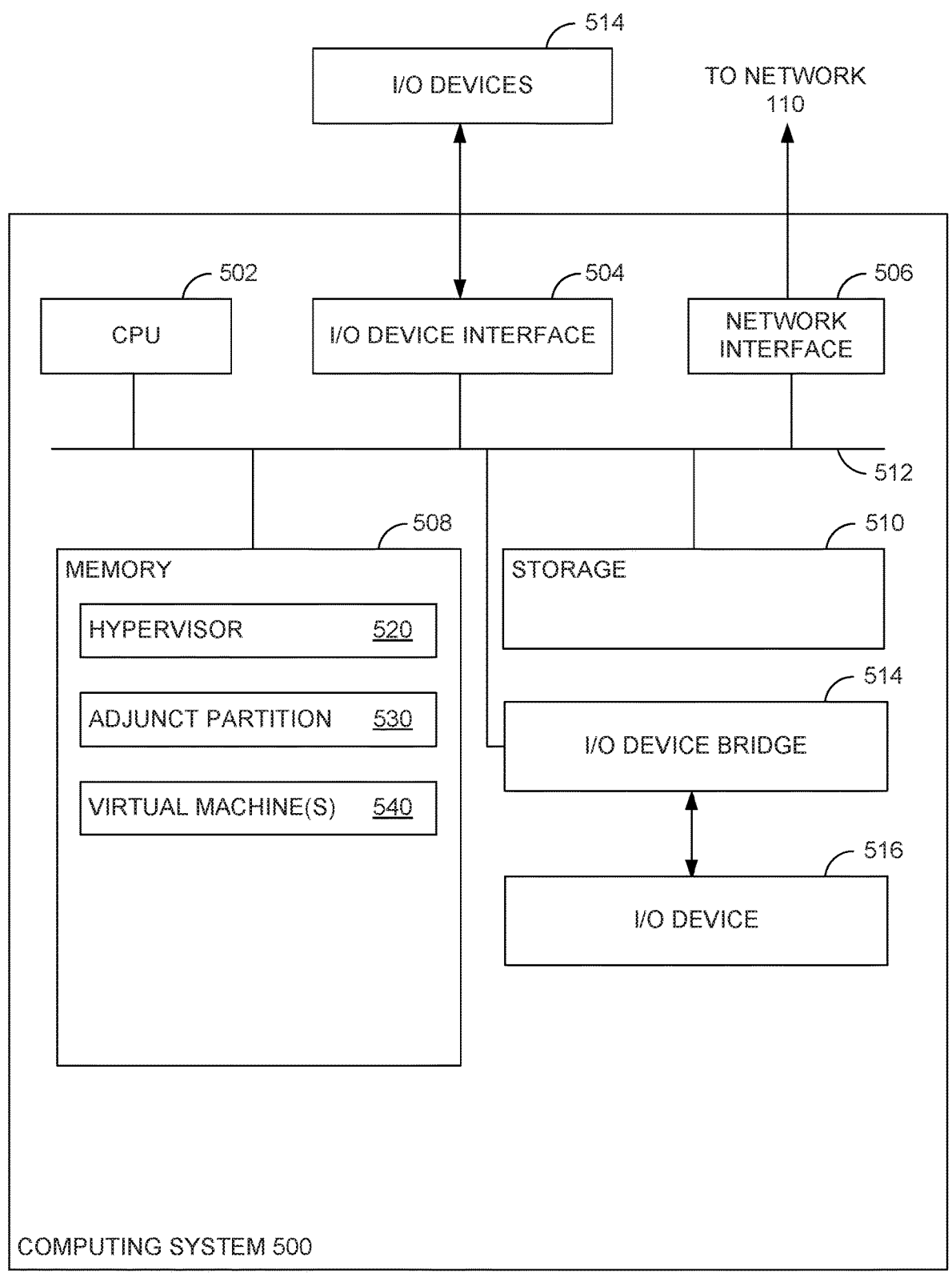
FIG. 5 illustrates an example system in which multiple virtual machines share ownership of an I/O device and interface directly with the I/O device, according to one embodiment.

FIG. 5 illustrates an example computing system 500 that shares a single coprocessor hardware context among multiple related processes, according to an embodiment. As shown, the server includes, without limitation, a central processing unit 502, one or more I/O device interfaces 504, which may allow for the connection of various I/O devices 514 (e.g., keyboards, displays, mouse devices, pen input, etc.) to the computing system 500, network interface 506, a memory 508, storage 510, coprocessor interface 514, coprocessor 516, and an interconnect 512.

CPU 502 may retrieve and execute programming instructions stored in the memory 508. Similarly, the CPU 502 may retrieve and store application residing in the memory 508. The interconnect 512 transmits programming instructions and application data among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

I/O device bridge 514 generally allows one or more I/O devices 516 installed in computing system 500 to communicate with CPU 502 and access memory space(s) in memory 508. As discussed above, I/O host bridge may include device configuration information that is set by a hypervisor 520 when I/O device 516 is configured and is used by one or more virtual machines 540 to find and configure I/O device 516. While computing system 500 operates, I/O host bridge 514 may detect errors at I/O device 516 and raise these errors to a hypervisor 520 in memory 508 for further processing.

As shown, memory 508 includes a hypervisor 520, adjunct partition 530 and one or more virtual machines 540. As discussed above, hypervisor 520 may generally be used to manage I/O functionality for the adjunct partition and the one or more virtual machines hosted on computing system 500. When computing system 500 is booted up or when a new I/O device 516 is added to computing system 500, hypervisor 520 generally configures the resources used by the I/O device and propagates shared ownership of the I/O device to the one or more virtual machines 540 hosted on computing system 500. As described above, adjunct partition 530 may be a hidden partition and may interact with I/O device bridge 514 to obtain information from I/O device 516, perform initial error recovery on I/O device 516, and indicate to hypervisor 520 whether or not the virtual machines 540 can perform operations using I/O device 516. For example, during error recovery operations, adjunct partition 530 can inform hypervisor 520 that the adjunct partition is currently performing error recovery operations that may require the one or more virtual machines 540 to freeze I/O activity on I/O device 516. As discussed above, if the error is a fatal error requiring more substantial configuration or replacement of the I/O device, adjunct partition 530 can inform hypervisor 520 that a fatal error has occurred, upon which hypervisor 520 can revoke shared ownership of the I/O device from the one or more virtual machines 540 until the fatal error is corrected.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the entity analytics system) or related data available in the cloud. For example, the entity analytics system could execute on a computing system in the cloud and determine relationships between different entities stored in the entity analytics system, for example, based on determining relationships between sub-entities. In such a case, the entity analytics system could receive an input specifying parameters for the entity analytics system to search for and determine relationships between entities and store information about the determined relationships at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for sharing a physical I/O device across a plurality of virtual machines, comprising:
    configuring shared ownership of the physical I/O device between a first partition and one or more of the plurality of virtual machines, wherein each virtual machine of the one or more virtual machines hosts a driver for the physical I/O device, and wherein the first partition comprises a hidden partition that does not host a general purpose operating system;
    transferring partial ownership of the physical I/O device from the first partition to the one or more virtual machines, wherein partial ownership of the physical I/O device allows the one or more virtual machines to directly access the physical I/O device;
    generating device configuration information for the physical I/O device to be used by the one or more virtual machines to access and configure the physical I/O device, wherein the device configuration information identifies a number of interrupts and memory spaces exclusively assigned to each of the one or more virtual machines for each respective virtual machine of the one or more virtual machines to directly access the physical I/O device using one or more physical functions and the identified interrupts and memory spaces exclusively assigned to the respective virtual machine;
    booting the one or more virtual machines;
    detecting an error at the physical I/O device;
    initiating error recovery operations at the first partition; and
    blocking error recovery operations at the one or more virtual machines until error recovery operations are completed at the first partition.

2. The method of claim 1, wherein the blocking error recovery operations at the one or more virtual machines comprises:
    setting a flag indicating that error recovery operations are executing at the first partition;
    receiving, from a first virtual machine of the one or more virtual machines, a request for information about the error; and
    transmitting, to the first virtual machine, information indicating that the first virtual machine is blocked from beginning error recovery operations.

3. The method of claim 1, further comprising: upon receiving information indicating that error recovery operations at the first partition are complete, allowing error recovery operations to begin at the one or more virtual machines.

4. The method of claim 1, further comprising:
    detecting a fatal error at the physical I/O device;
    terminating physical I/O device operations at the one or more virtual machines;
    revoking partial ownership of the physical I/O device from the one or more virtual machines; and
    initiating device recovery procedures.

5. The method of claim 4, wherein the device recovery procedures comprise:
    revoking ownership of the physical I/O device from the first partition; and
    upon replacement of the physical I/O device with a second physical I/O device, configuring the second physical I/O device and granting full ownership of the second physical I/O device to the first partition.

6. The method of claim 4, further comprising:
    upon completing device recovery procedures, restoring physical I/O device access to the one or more virtual machines.

7. The computer program product of claim 1, wherein the operations further comprise:
    detecting a fatal error at the physical I/O device;
    terminating physical I/O device operations at the one or more virtual machines;
    revoking partial ownership of the physical I/O device from the one or more virtual machines; and
    initiating device recovery procedures.

8. The computer program product of claim 7, wherein the operations further comprise:
    upon completing device recovery procedures, restoring physical I/O device access to the one or more virtual machines.

9. The method of claim 1, wherein allowing the virtual machines to directly access the physical I/O device comprises allowing the virtual machines to use the device configuration information to communicate with the physical I/O device without communicating through a hypervisor or virtual functions.

10. A computer program product, comprising:
    a computer-readable storage medium having computer readable program code embodied therewith, the computer readable program code configured to perform an operation for sharing a physical I/O device across a plurality of virtual machines, the operation comprising:
        configuring shared ownership of the physical I/O device between a first partition and one or more of the plurality of virtual machines, wherein each virtual machine of the one or more virtual machines hosts a driver for the physical I/O device, and wherein the first partition comprises a hidden partition that does not host a general purpose operating system;
        transferring partial ownership of the physical I/O device from the first partition to the one or more virtual machines, wherein partial ownership of the physical I/O device allows the one or more virtual machines to directly access the physical I/O device, wherein the device configuration information identifies a number of interrupts and memory spaces exclusively assigned to each of the one or more virtual machines for each respective virtual machine of the one or more virtual machines to directly access the physical I/O device using one or more physical functions and the identified interrupts and memory spaces exclusively assigned to the respective virtual machine;

generating device configuration information for the physical I/O device to be used by the one or more virtual machines to access and configure the physical I/O device;

booting the one or more virtual machines;

detecting an error at the physical I/O device;

initiating error recovery operations at the first partition; and blocking error recovery operations at the one or more virtual machines until error recovery operations are completed at the first partition.

11. The computer program product of claim 10, wherein the blocking error recovery operations at the one or more virtual machines comprises:

setting a flag indicating that error recovery operations are executing at the first partition;

receiving, from a first virtual machine of the one or more virtual machines, a request for information about the error; and transmitting, to the first virtual machine, information indicating that the first virtual machine is blocked from beginning error recovery operations.

12. The computer program product of claim 10, wherein the operations further comprise:

upon receiving information indicating that error recovery operations at the first partition are complete, allowing error recovery operations to begin at the one or more virtual machines.

13. A system, comprising:

a processor; and a memory storing one or more instructions which, when executed by the processor, performs an operation for sharing a physical I/O device across a plurality of virtual machines, the operation comprising:

configuring shared ownership of the physical I/O device between a first partition and one or more of the plurality of virtual machines, wherein each virtual machine of the one or more virtual machines hosts a driver for the physical I/O device, and wherein the first partition comprises a hidden partition that does not host a general purpose operating system;

transferring partial ownership of the physical I/O device from the first partition to the one or more virtual machines, wherein partial ownership of the physical I/O device allows the one or more virtual machines to directly access the physical I/O device;

generating device configuration information for the physical I/O device to be used by the one or more virtual machines to access and configure the physical I/O device, wherein the device configuration information identifies a number of interrupts and memory spaces exclusively assigned to each of the one or more virtual machines for each respective virtual machine of the one or more virtual machines to directly access the physical I/O device using one or more physical functions and the interrupts and memory spaces exclusively assigned to the respective virtual machine; and booting the one or more virtual machines;

detecting an error at the physical I/O device;

initiating error recovery operations at the first partition; and blocking error recovery operations at the one or more virtual machines until error recovery operations are completed at the first partition.

14. The system of claim 13, wherein the operations further comprise:

upon receiving information indicating that error recovery operations at the first partition are complete, allowing error recovery operations to begin at the one or more virtual machines.

15. The system of claim 13, wherein the operations further comprise:

detecting a fatal error at the physical I/O device;

terminating physical I/O device operations at the one or more virtual machines;

revoking partial ownership of the physical I/O device from the one or more virtual machines; and initiating device recovery procedures.

16. The system of claim 15, wherein the operations further comprise:

upon completing device recovery procedures, restoring physical I/O device access to the one or more virtual machines.

* * * * *